Patented Dec. 30, 1952

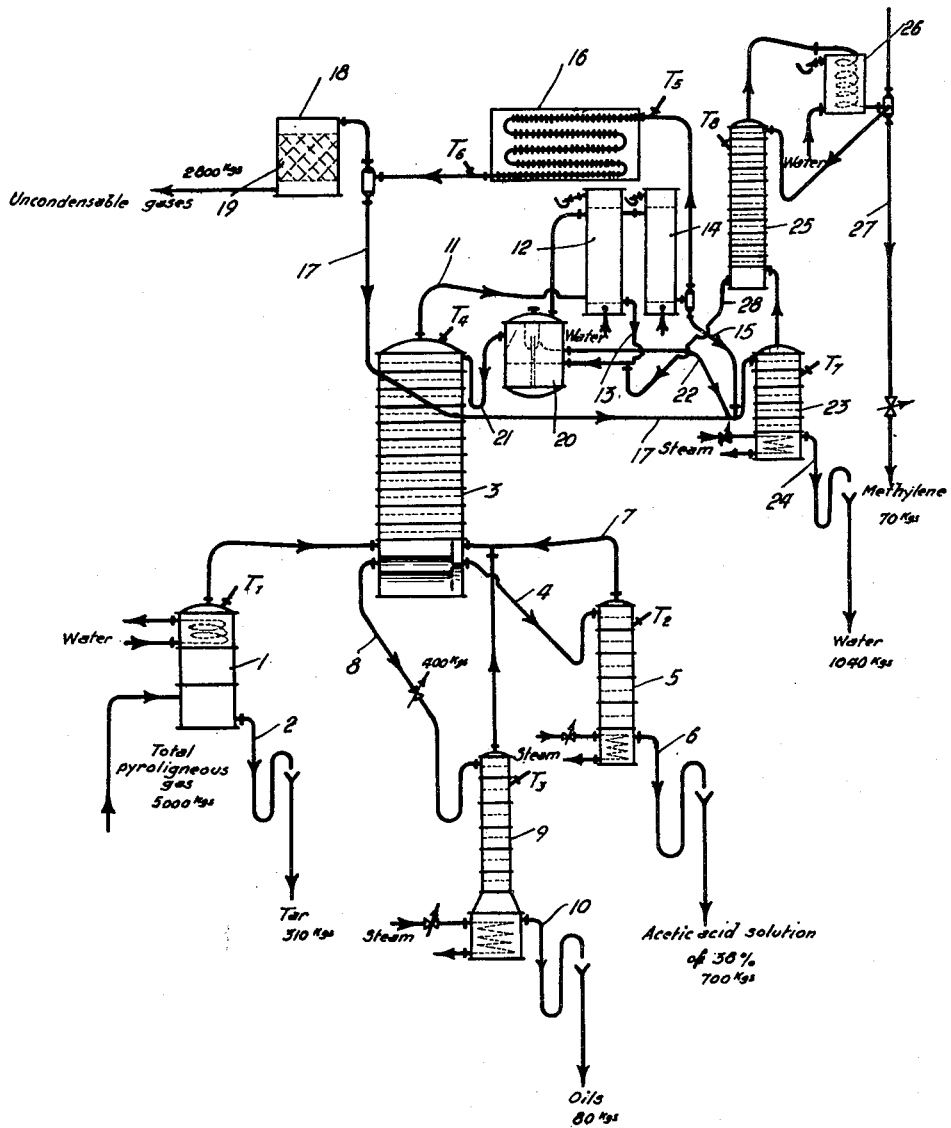

2,623,845

UNITED STATES PATENT OFFICE 2,623,845

DISTILLATION OF WOOD CARBONIZATION PRODUCTS

Charles Coutor, Premery, France, assignor to Etablissements Lambiotte Freres, Premery, France, a corporation of France Application March 21, 1949, Serial No. 82,621
In France March 30, 1948

7 Claims. (Cl. 202—42)

1

This invention relates to a method for obtaining acetic acid from a gaseous mixture coming from the carbonization of wood.

It is known that pyroligneous liquors obtained through condensing the gaseous mixtures coming from the carbonization of wood contain acetic acid besides tars and alcoholic products called "methylene" and to separate this acid in the form of a concentrated solution it is usual to distill said liquors in the presence of bodies called "water removers." The latter are bodies not very soluble in water and capable of forming with it an azeotropic mixture by lowering its boiling point of a relatively high quantity of about 10° C.

Whatever the "removers" may be which are used the latter must keep a constant analysis and experience showed that it is necessary previously to remove the alcoholic products through a partial distillation before the treatment in the presence of a remover even when the latter is formed of an only fraction contained in the products of the carbonization.

The methods which are presently used to obtain acetic acid from gaseous mixtures coming from the carbonization of wood consist, therefore, first in condensing said gaseous mixtures in order to separate the non-condensable gases therefrom, in removing the alcoholic products from the so obtained pyroligneous liquor through a partial distillation and in removing the tar through a complete distillation, in treating the vapours resulting from this latter distillation in a suitable column by means of a water remover and, lastly, in separating the water from the remover for example through a condensation of the mixed vapours, water and remover decantation of the water saturated with remover, returning the decanted remover to the distillation column and recovering the remover dissolved in water through a partial distillation and elimination of said water.

A concentrated solution of acetic acid is thus collected at the foot of the above mentioned column.

Now, I have found that it is possible to avoid the initial condensation and distillation and to put the mixture of pyroligneous vapours and of non-condensable gases coming from the carbonization of wood directly into contact with a remover.

The method in accordance with the invention comprising causing the gaseous mixture, possibly after removal of the tar, to pass through a distillation column containing a remover in a

2 sufficient quantity in order that the liquid in the foot always contains free remover, decanting the liquids collected in the foot of the distillation column and separating into two layers formed the one of oils mixed with remover and the other of a concentrated solution of acetic acid equally mixed with remover, in eliminating both said layers separately and, lastly, in exhausting the second layer through elimination of the remover by any known means.

The exhausting of the acetic acid solution through elimination of the remover may be effected either through a partial distillation or through extraction in a liquid phase by means of a solvent which is not very soluble in the concentrated acid solution and which can readily be separated from the remover through distillation, the so recovered remover being returned to the main distillation column.

As mentioned above, the oils are mixed with remover and said oils are advantageously rectified in order to recover this remover which is returned to the main distillation column.

The possible de-tarring may be effected either through a partial condensation as it is made usually when the pyroligneous vapours are directly used for making lime acetate or electrically or still through a partial washing with remover, as it is made sometimes when the pyroligneous liquors contain neither alcoholic products nor condensable gases.

The gaseous mixture obtained at the head of the main distillation column is formed of steam, non-condensable gases as well as methylene vapours and contains an important quantity of remover. It is necessary to separate these various components from one another and, more particularly, to recover the remover. For this object, one preferably proceeds to a fractional condensation of the gaseous mixture in order to separate, on the one hand, water with almost the totality of the remover and a small quantity of alcoholic products and, on the other hand, a liquid containing a little water, poor in remover but rich in alcoholic products and, lastly, gases free from remover but containing alcoholic products and which are treated, for example, through refrigeration in order to recover said products, the first fraction being directed to a decanter where the remover is collected and returned to the distillation column while the remainder is taken again and mixed with the second fraction as well as with the alcoholic products coming from the non-condensable gases whereafter the mixture is subjected to a fractionated distillation in order to separate the alcoholic products in the head of the apparatus, water in the tail and, in the middle, a mixture of water and remover which is returned to the decanter.

The method in accordance with the invention may be used with any remover suitable for the azeotropical distillation of the aqueous solutions of acetic acid in the absence of non-condensable gases and of alcoholic products but in order that the method may be economical it is preferable to choose said removers so that it removes a large quantity of water and, accordingly, so that it has a rather high boiling point while giving small waters which are very poor in acid. Furthermore, it is necessary that the remover is not very soluble in the concentrated acetic acid solution to be collected.

It is possible, more particularly, to use butyl acetate, wood oils having a boiling point between 110° and 130° C., acetone oils the boiling points of which are also between 110° and 130° C. or ethyl carbonate.

The accompanying drawing is a diagrammatical view showing by way of example a form of execution of the method in accordance with the invention applied to a gaseous mixture coming from a continuous carbonization oven treating hard woods and producing per hour 5,000 kgs. of gaseous products which leave the oven at 120° C.

The gaseous mixture is introduced into a detarrer 1 which is a bubbling apparatus provided with a condenser and which reduces the temperature of the gaseous mixture to about 90° C. at $T_1$. About 310 kgs. of tar are condensed which are removed at 2.

The de-tarred gaseous mixture passes then upward through a column 3 which contains plates provided with butyl acetate and the base of which is made so that it may act as a decanter. The quantity of butyl acetate is such that the liquid in the base always contains a certain quantity thereof.

The products collected in said column are the acetic acid, some oils and one part of the water and the whole separates into two layers formed one of the oils mixed with butyl acetate and the other of a concentrated acetic acid solution also mixed with butyl acetate.

Said layers are drawn off and the aqueous layer is directed through piping 4 to the top of a distillation column 5 the foot of which is heated through steam so that the temperature at $T_2$ is about 97° C. In the bottom, at 6, about 700 kgs. per hour of a raw solution of 36% acetic acid are collected and this solution is treated later by any known means in order to obtain the pure acid. The vapours issuing from said column and containing the butyl acetate which was mixed with the aqueous layer are returned through piping 7 to the base of column 3.

The mixture of oils and butyl acetate about 400 kgs. per hour of which are drawn off at 8 is directed to the top of a column 9 the foot of which is heated with steam in order that the temperature at $T_3$ is about 130° C. In the foot of said column at 10 about 30 kgs. per hour of various wood oils are collected. The vapours are returned to the foot of column 3.

The gaseous products issuing from column 3 at a temperature which is of about 77° C. at $T_4$ contain the major part of the water, the non-condensable gases, the methylene and an important quantity of butyl acetate.

Said gaseous products are directed through piping 11 to a condenser 12 maintained tepid and in which the water, the butyl acetate are collected at 13 together with a small quantity of methylene owing to tepidity of condenser 12. The non-condensed products pass through a cooler 14 which is maintained as cold as possible by means of water. The butyl acetate and the water which were not condensed in condenser 3 are collected at 15 as well as methylene. The non-condensed products which still contain an important quantity of methylene are directed to a refrigerator 16 which they enter at a temperature of 20° C. at $T_5$ and which they leave at —40° C. at $T_6$. The methylene is condensed and is collected at 17. Then the gases pass on active coal 19 in an absorber 18 where they abandon their last traces of volatile products. About 2800 kgs. per hour of non-condensable gases leave said absorber.

The condensate collected at 13 is directed to a decanter 20 where a separation takes places between, on the one hand, at 21 butyl acetate which is returned to the top of column 3 and, on the other hand, at 22, water saturated with butyl acetate which is mixed with the condensates flowing through branch pipes 15 and 17, the whole being directed to a distillation column 23. The temperature of said column is regulated to about 95° C. at $T_7$ in order that practically pure water (1040 kgs. per hour) is collected on the foot at 24 while the recovered butyl acetate and the methylene are directed to the foot of a second column 25 the temperature of which is about 70° C. at $T_8$. The head products pass to a cooler 26 and about 70 kgs. per hour of methylene are collected at 27.

The liquids collected in the base of column 25 are directed through pipe branch 28 to the decanter 29 whereby the recovered butyl acetate is returned to the cycle while the water charged with alcoholic products is returned to column 23.

What I claim is:

1. A method for obtaining acetic acid from gaseous mixtures coming from the carbonization of wood, comprising causing the gaseous mixture to pass through a distillation column which contains an azeotrope forming remover of water in a sufficient quantity in order that the liquid in the base always contains free remover, the solubility of said remover in concentrated acetic acid solution to be collected being low, to produce stratification, recovering by fractionated condensation the remover which is contained in the gases escaping from the head of said column, decanting the liquid which is collected at the foot of said distillation column in two layers formed one of oils mixed with remover and the other of a concentrated acetic acid solution also mixed with said remover, removing both said layers from said column separately, exhausting the remover from each of the mixtures forming said two layers and returning all the portions of recovered remover to the distillation column.

2. A method for obtaining acetic acid from gaseous mixtures coming from the carbonization of wood, as set forth in claim 1 in which the remover of water is an oxygenated organic product the boiling point of which is comprised between 110° and 130° C. selected from the group consisting of butyl acetate, wood oils having a boiling point between 100° and 130° C., acetone oils the boiling points of which are between 100° and 130° C. and ethylcarbonate.

3. A method for obtaining acetic acid from gaseous mixtures coming from the carbonization of wood, comprising de-tarring the gaseous mixture, causing the latter to pass through a distillation column containing an azeotrope forming remover of water in a sufficient quantity in order that the liquid in the base always contains free remover, the solubility of said remover in concentrated acetic acid solution to be collected being low, to produce stratification, recovering by fractionated condensation the remover which is contained in the gases escaping from the head of such column, decanting the liquid which is collected at the foot of said distillation column in two layers formed one of oils mixed with a remover and the other of a concentrated acetic acid solution also mixed with said remover, removing both said layers from said column separately, exhausting the remover from each of the mixtures forming said two layers and returning all the portions of recovered remover to the distillation column.

4. A method for obtaining acetic acid from gaseous mixtures coming from the carbonization of wood, as set forth in claim 1 in which each of both isolated layers is submitted to partial distillation in a distilling column in order to recover the remover, whereby oils and acetic acid solution are collected.

5. A method for obtaining acetic acid from gaseous mixtures coming from the carbonization of wood as set forth in claim 3, in which de-tarring of the gaseous mixture is obtained by partially condensing said gaseous mixture.

6. A method for obtaining acetic acid from gaseous mixtures coming from the carbonization of wood, comprising causing the gaseous mixture to pass through a distillation column which contains an azeotrope forming remover of water in a sufficient quantity in order that the liquid in the base always contains free remover, the solubility of said remover in concentrated acetic acid solution to be collected being low, to produce stratification, proceeding to a fractionated condensation of the gaseous mixture issuing from the head of said distillation column in order to separate three fractions, first, water with almost the totality of the remover and a small quantity of alcoholic products, secondly, a liquid containing a little water, poor in remover but rich in alcoholic products and, thirdly, gases free from remover but containing alcoholic products, recovering the alcoholic products from the gases free from remover, directing the first fraction into a decanter, collecting the remover in said decanter and returning it to said distillation column, taking again the products remaining in said decanter and mixing them with the second fraction as well as with the alcoholic products coming from the non-condensable gases thereafter subjecting the mixture to a fractionated distillation in order to separate the alcoholic products in the head of the apparatus, water in the tail and, in the middle, a mixture of water and remover which is returned to the decanter, decanting the liquid which is collected at the foot of said distillation column in two layers formed one of oils mixed with remover and the other of a concentrated acetic acid solution also mixed with said remover, removing both said layers from said column separately, exhausting the remover from each of the mixtures forming said two layers and returning all the portions of recovered remover to the distillation column.

7. A method for obtaining acetic acid from gaseous mixtures coming from the carbonization of wood, comprising detarring the gaseous mixture, causing the latter, to pass through a distillation column which contains an azeotrope forming remover of water in a sufficient quantity in order that the liquid in the base always contains free remover, the solubility of said remover in concentrated acetic acid solution to be collected being low, to produce stratification, proceeding to a fractionated condensation of the gaseous mixture issuing from the head of said distillation column in order to separate three fractions, first, water with almost the totality of the remover and a small quantity of alcoholic products, secondly, a liquid containing a little water, poor in remover but rich in alcoholic products and, thirdly, gases free from remover but containing alcoholic products, recovering the alcoholic products from the gases free from remover, directing the first fraction into a decanter, collecting the remover in said decanter and returning it to said distillation column, taking again the products remaining in said decanter and mixing them with the second fraction as well as with the alcoholic products coming from the non-condensable gases thereafter subjecting the mixture to a fractionated distillation in order to separate the alcoholic products in the head of the apparatus, water in the tail and, in the middle, a mixture of water and remover which is returned to the decanter, decanting the liquid which is collected at the foot of said distillation column in two layers formed one of oils mixed with remover and the other of a concentrated acetic acid solution also mixed with said remover, removing both said layers from said column separately, exhausting the remover from each of the mixtures forming said two layers and returning all the portions of recovered remover to the distillation column.

CHARLES COUTOR.

REFERENCES CITED

The following references are of record in the file of this patent:

UNITED STATES PATENTS

| Number | Name | Date |
| --- | --- | --- |
| 1,697,738 | Suida | Jan. 1, 1929 |
| 1,703,020 | Suida | Feb. 19, 1929 |
| 1,917,391 | Othmer | July 11, 1933 |
| 1,959,547 | Ricard et al. | May 22, 1934 |
| 2,050,234 | Othmer | Aug. 4, 1936 |
| 2,290,157 | Bright | July 21, 1942 |
| 2,290,483 | Othmer | July 21, 1942 |

OTHER REFERENCES

Othmer, "Azeotropic Distillation for Dehydrating Acetic Acid," Chemical and Metallurgical Engineering, June 1941.